United States Patent [19]

Singer et al.

[11] Patent Number: 4,969,625
[45] Date of Patent: Nov. 13, 1990

[54] TORQUE REACTION TOOL SUPPORT APPARATUS

[75] Inventors: Martin Singer, Lauderhill; Nathan Singer, Tamerac, both of Fla.

[73] Assignee: Nasco Industries, Inc., Fort Lauderdale, Fla.

[21] Appl. No.: 199,162

[22] Filed: May 26, 1988

[51] Int. Cl.⁵ .............................................. F16M 13/00
[52] U.S. Cl. .................................. 248/662; 248/123.1; 248/280.1; 248/663
[58] Field of Search ............... 248/662, 644, 647, 655, 248/661, 122, 123.1, 124, 126, 278, 279, 280.1, 663

[56] References Cited

U.S. PATENT DOCUMENTS

| | | | |
|---|---|---|---|
| 504,491 | 9/1893 | Doriot | 248/280.1 X |
| 801,664 | 10/1905 | Holtmann | 248/279 |
| 1,117,917 | 11/1914 | Schoenky | 248/647 X |
| 1,283,446 | 11/1918 | Anderson | 248/279 |
| 1,823,649 | 9/1931 | Goldberg et al. | 248/278 |
| 2,211,480 | 8/1940 | Ring | 248/123.1 X |
| 2,389,553 | 11/1945 | Sellars | 248/662 |
| 2,652,221 | 9/1953 | Kampa | 248/278 |
| 2,881,998 | 4/1959 | Robbins | 248/279 X |
| 3,417,949 | 12/1968 | Waber | 248/662 X |
| 4,621,786 | 11/1986 | Greenlee | 248/123.1 X |

OTHER PUBLICATIONS

Desoutter Brochure entitled Stands, Bench, Tidy Systems, Filters, Regulators and Lubricants-25.
Cleco Air Tools Catalog—1987—Tool Stands and Torque Absorption Arms.
Brochure D. W. Zimmerman Mfg. Inc. 1986, Zimmerman Model 400B Tool Balancer.

*Primary Examiner*—David L. Talbott
*Attorney, Agent, or Firm*—Richard M. Saccocio

[57] ABSTRACT

Tool support apparatus for air- or electrically-driven power tools is disclosed. A unique ergonomically designed torque reaction arm is attached to a vertical support member at a lower portion thereof and substantially in line with the horizontal location of the tool which is used therewith. The torque reaction arm includes two or more telescopically-arranged individual support arm segments. A counterbalancing apparatus may be attached directly to the vertical support member to the upper end thereof.

13 Claims, 2 Drawing Sheets

TORQUE REACTION TOOL SUPPORT APPARATUS

BACKGROUND OF THE INVENTION

1. Field of the Invention

This invention pertains in general to the field of hand-operated tool support systems and in particular to the field of hand-operated air or electric power driven tools, either bench mounted or floor standing, which are used for assembly line manufacturing.

2. Description of the Prior Art

Nasco Industries, Inc. is the originator of integrated air-tool support systems in the United States of America. Such tool support systems, in general, comprise a mounting to which a hand-operated tool is attached, its source of air or electric power, and a balancer for counteracting the weight of the tool. Generally, such tool support systems are provided with various degrees of motion so that maximum utilization of the tool may be effectuated. Such degrees of motion have generally included up-and-down, in-and-out, side-to-side, and pivotal-and-rotational tool motions. Such motions must, of course, be compatible with a counterbalancing arrangement whereby the weight of the tool is negated or counterbalanced during actual use of the tool by the operator.

The attainment of the above-described various degrees of motion has, in the past, been easily accomplished by an L-shaped support stand with the horizontal member being uppermost on the stand. The hand-operated power tool is merely suspended from the upper horizontal beam by a flexible cord or wire attached at one end to the tool and the other end to a counterbalancing apparatus which may comprise a variable force return spring or other like apparatus. Such tool supported systems have, in the past, been widely used very effectively. Eventually, it came to be realized that an operator using rotational power tools with or without such tool support systems constantly, throughout an eight-hour work day, developed an injury known as a carpal tunnel syndrome. This injury is caused by the operator having to counteract the torque developed by the air- or electrically-driven power tool. Accordingly, continued development of the prior art tool support systems began to include ergonomic aspects, whereby the torque developed by the power tool is absorbed by the tool support apparatus.

In order to overcome the carpal tunnel syndrome, tool support apparatus having the degrees of motion above-stated, and including a torque absorption arm which is attached at one end to the vertical member of the tool support apparatus and at its other end to the power tool. By rigidly clamping one end of the tool absorption arm to the power tool, the torque developed by the power tool is then absorbed by the torque absorption arm. This eliminated the need for the operator to resist with his hand, arm and body the torque developed by the power tool during its use.

While the torque absorption arms of the prior art effectively overcame the torque developed by the power tool, it tended to interfere with the various degrees of motion which are required of an adequate tool support stand. The prior art tool support stands, therefore, traded off the simplicity of achieving the various degrees of motion required with the elimination of the torque developed by the power tool. In general the prior art tool support stands have never completely or successfully provided for both the various degrees of motion and the torque absorption requirements with one single reaction arm. The prior art tool support stands have consisted of a trade off between the various degrees of motion and the torque absorption requirements.

Accordingly, the primary objective of the present invention is to provide a tool support stand for a power-driven tool, either electric or air, which incorporates all five various degrees of motion and the ergonomic considerations of absorbing the torque developed by the power tool during use.

Another object of the present invention is to provide tool support apparatus for a power-driven tool which provides the five degrees of motion with each of the degrees of motion being attained in an effortless fashion.

Another object of the present invention is to provide tool support apparatus which includes a torque absorption arm which effectively eliminates the torque reaction from the power tool without interfering with the five degrees of motion required by the power tool to effectively use the same.

In other prior art apparatus, both the movement requirements and the torque reaction requirements in a single tool support apparatus is obtained by utilizing upper and lower horizontal support arms. In this prior art the counterbalancing apparatus is attached to the lower horizontal arm which moves in and out as well as other motions. Therefore, the counterbalancing force can vary with the in-and-out motion in addition to the other motions.

Accordingly, another object of the present invention is to provide tool support apparatus which provides for in-and-out tool motion but does not vary the force of counterbalancing apparatus.

The above-stated objects as well as other objects which although not specifically stated, but are intended to be included within the scope of the present invention, are accomplished by the present invention and will become apparent from the hereinafter set forth Detailed Description of the Invention, Drawings, and the claims appended herewith.

SUMMARY OF THE INVENTION

The present invention accomplishes the above-stated objectives, as well as others, by providing tool support apparatus for an air- or electrically-driven rotary power tool which provides for up-and down, in-and-out, side-to-side, and rotational-and-pivotal degrees of motion while eliminating the torque reaction of the tool which is developed during use of the same.

In an exemplary embodiment of the present invention, the horizontal upper support arm of the prior art is eliminated. A vertical support post is provided in conjunction with a horizontal support arm, the latter of which is located a considerable distance beloW the upper end of the vertical post. The counterbalancing tool weight mechanism is attached to the upper end of the vertical support member and is axially positionable therealong. Instead of attaching the free end of the flexible wire of the counterbalancing spring apparatus to the end of the tool, it is attached to a portion of the horizontal torque absorption arm which does not move in or out. The horizontal torque absorption arm is axially positionable along the length of the vertical arm and is vertically-pivotally and horizontally pivotally attached to the vertical arm. The torque absorption arm is uniquely arranged in two or more telescoping sections which provide for in-and-out motion and rotational (about the longitudinal axis of the torque absorption arm) motion of the power tool. The end of the torque absorption or reaction arm, is pivotally attached to a tool attaching member which thereby provides for the vertically-pivotable degree of motion. The telescoping torque reaction arm allows the in-and-out motion without requiring clearance space behind the vertical support arm to accommodate the constant length torque absorption arm of the prior art.

The vertical support post may be provided with a base plate for attachment to a workbench or the floor and thereby provide for bench mounting or floor standing tool support apparatus. In addition, a C-clamp type of arrangement may be provided to allow the attachment of the tool support apparatus of the present invention to a workbench at any location thereon.

Various other objects, advantages and features of the invention will become apparent to those skilled in the art from the following discussion taken in conjunction with the following drawings, in which:

DESCRIPTION OF THE PREFERRED EMBODIMENTS

Figure 1:
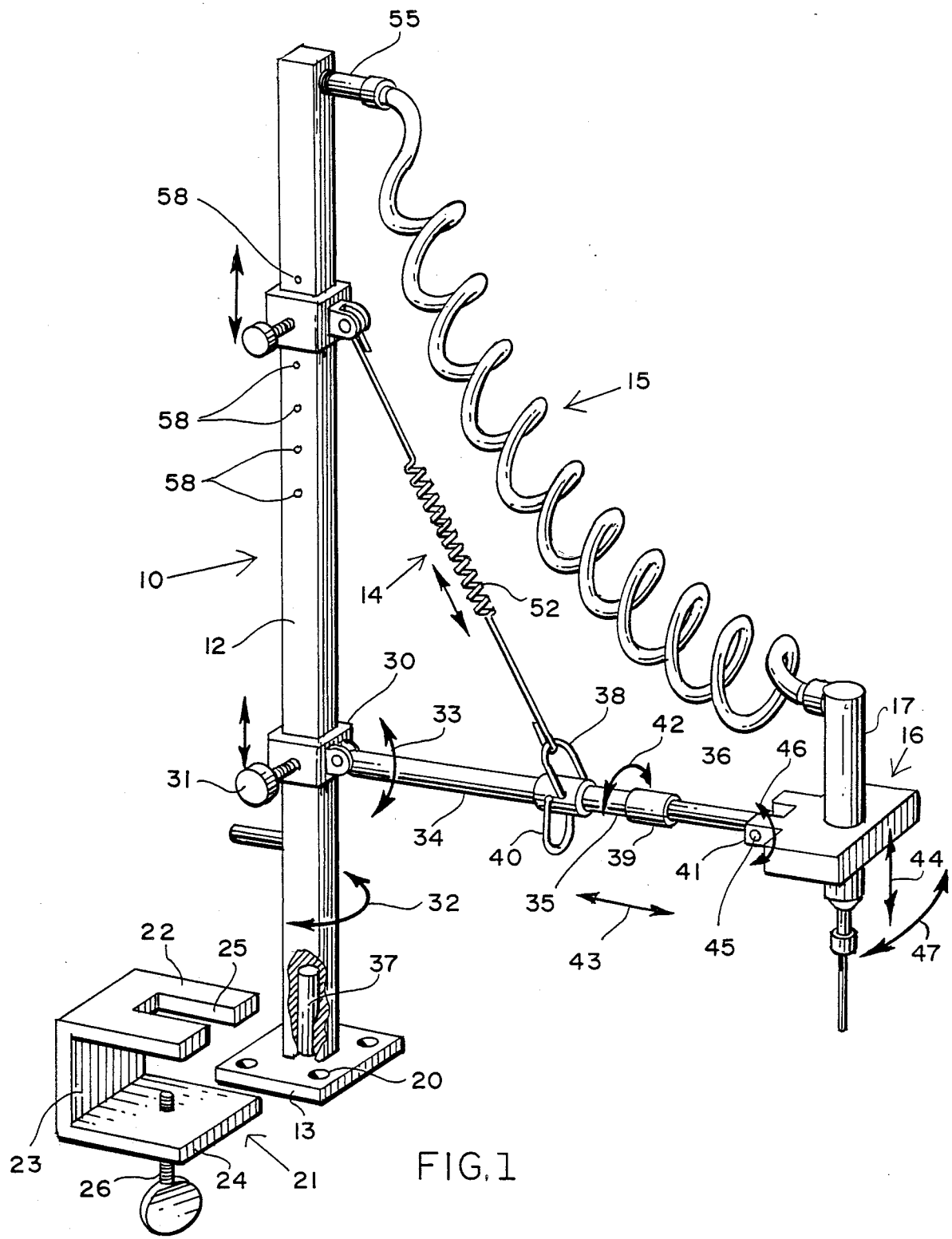
FIG. 1 is isometric view of the ergonomic designed tool support apparatus of the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings wherein like characteristics and features of the present invention shown in the various figures are designated by the same reference numerals.

Referring now to the drawings, specifically FIG. 1 thereof, there is illustrated an isometric view of the inventive tool support apparatus 10 which provides for five degrees of motion of a power-driven tool and includes an ergonomically-designed torque reaction arm 11. The inventive tool support apparatus 10 includes a vertical support post 12, a base 13, counterbalancing support apparatus 14, power supply apparatus 15, and tool attachment apparatus 16. An electrically- or air-driven power tool 17 is attached to tool attachment member 16.

Vertical support post 12 may comprise a structural support member comprising a square tube or other appropriately shaped structural member such as a round tube. Typically, the length of vertical support member 12 may be of the order of twelve to forty-eight inches. A base 13, which may comprise a square or circular plate of steel, includes a pin 37 attached thereto and extending in a vertical direction. Vertical member 12, whether square or round, may include a circular, axially- aligned opening at its lower portion which fits over the axial pin and provides for horizontal rotary motion as shown by arrows 32. Base member 13 may be provided with through holes 20 which allow for attachment of base 13 to a workbench or the floor by means of appropriate screw threaded fasteners (not shown). Alternatively, base 13 may be clamped to any position along any edge of a workbench by use of clamping member 21.

Clamping member 21 may comprise three plates arranged in a C-shaped pattern 22, 23, and 24. Upper horizontal member 22 is provided with a cutout 25 having a width which is slightly larger than the across-the-corner dimension of a square vertical post 12 or the diameter of a round vertical post member 12. Cutout 25 allows plate member 22 to fit around and extend beyond vertical support member 12 and allows vertical member 12 to rotate. Lower support plate 24 of clamp member 21 is provided with a threaded rotating member 26. Clamping member 21 thus fits over base 13 as well as the thickness of the workbench to which tool support apparatus 10 is to be attached. When vertical support member 12 is positioned as desired, at any position on the workbench, threaded member 26 is rotated to cause base plate 13 to be clamped to the top of the workbench.

Torque reaction arm 11 is attached at one end to a box member 30 which is attached to vertical member 12 and the other end of torque reaction arm 11 is attached to tool support member 16. Box member 30 is positioned around the external surface of vertical member 12 and is positionable therealong at any desired position. When a desired position is attained, screw member 31 is rotated so as to clamp and fixedly secure box member 30 to vertical member 12. The end of torque reaction arm 11 attached to box member 30 provides for pivotally-vertical movement as shown by arrows 33. Rotation motion 32 provides for side-to-side movement 47 of tool 17, while pivotal motion 33 provides for up-and-down motion 44 of tool 17.

In the embodiment illustrated in FIG. torque reaction arm 11 includes three telescopic sections 34, 35 and 36 with section 34 being of the largest diameter and with section 35 telescoping therewithin, section 36 having the smallest diameter and telescoping within section 35. Thus, section 34 does not move in or out. A collar 37 is provided on section 34 which serves partly as a means to attach bail 38 thereto. Collars 37 and 39 may contain linear motion bearings which permit the inner members 35 and 36 to slide freely and effortlessly in the axial direction (arrows 43) and rotationally around the longitudinal axis (arrows 42). Collar 39 additionally serves as a stop when section 35 is telescoped within section 34 and thereby limits the inward travel of section 35. An end surface 41 of tool attaching member 16 to which the end of section 36 is attached, may serve as a stop limiting the amount of telescoping of section 36 within section 35. Section 35 and section 36 may each rotate relative to each other and section 34 so as to provide the vertically-rotational motion 42 to tool 17. The telescoping of sections 35 and 36 provide for the in-and-out motion 43 of tool 17. Pivotal motion 33, when translated along the length of torque reaction arm 11, provides for up-and-down motion 44 of tool 17. A pin 45 is used to pivotally connect tool attachment member 16 to the end of telescoping section 36 of torque reaction arm 11. Pin 45 provides for vertical pivoting motion 46 of tool 17.

A lower bail 40 may be attached to collar 37 for purposes of storing a tool 17 therein when the apparatus 10 is not in use.

Figure 3:
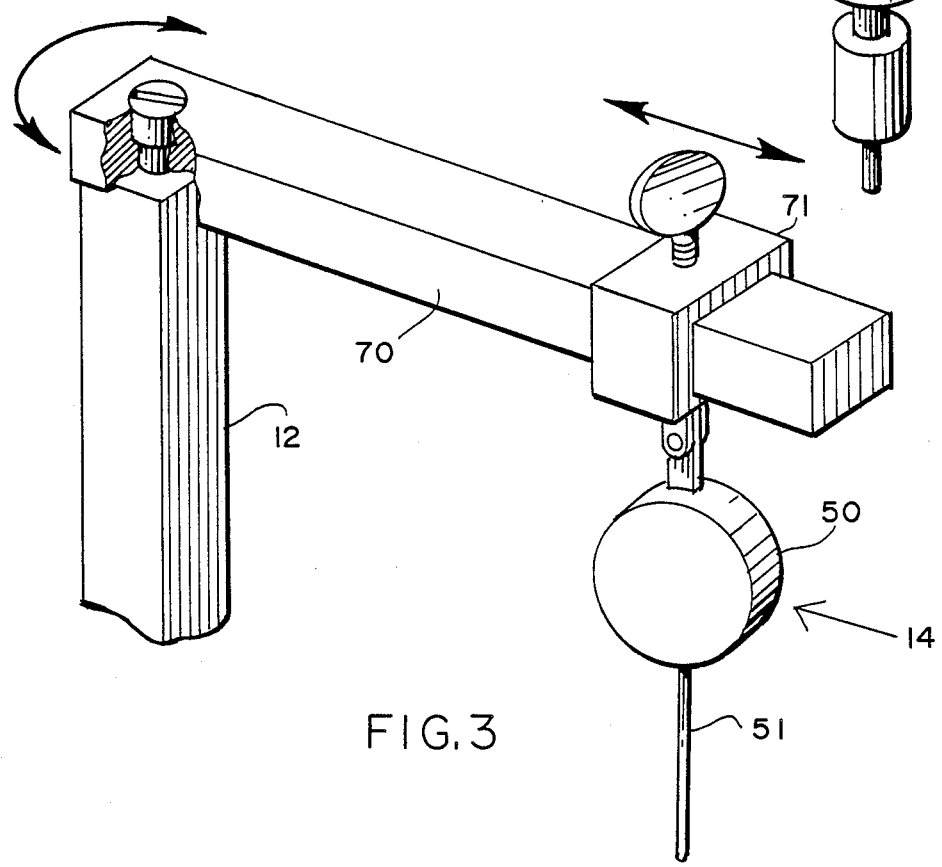

Counterbalancing apparatus 14 may comprise a conventional coil extension spring 52 or a conventional spring-activated counterbalancing reel having a flexible cord attached thereto and extending therefrom (as shown in FIG. 3). V-spring 52 is attached to another box member 53. Box member 53 may be similar to box member 30 and provide for axial movement of counterbalancing apparatus 14 along the length of vertical member 12 so as to vary the counterbalancing force exerted by apparatus 14. Spring force variability is most useful so that an operator may change the force needed to manipulate a tool 17. Holes 58 provide another means of attaching spring 52 to post 12 and for varying the counterbalancing force of spring 52. Any one of holes 58 may be used depending upon the spring force desired.

Power supply apparatus 15 may comprise flexible electrical or coiled air tubing. Coiled air tubing is attached at one end to tool 17 and the other end to fitting 55 attached to vertical arm 12. The other end of fitting 55 may be conventionally attached to an air-driven power supply. Where flexible electrical wire is used, the wire may extend from tool 17 to a location at the top of vertical post 12 from where it maY continue downward and be conventionallY plugged into an electrical outlet.

In operation, the clamping of tool 17 to attached member 16 provides for the absorption of the torque developed by tool 17 through telescopic arm 11 an ultimately to vertical member 12 and base member 13 thereof. The in-and-out telescopic motion of torque reaction arm 11 provides for smooth in-and-out motion 43 as well as rotational motion 42.

Figure 2:
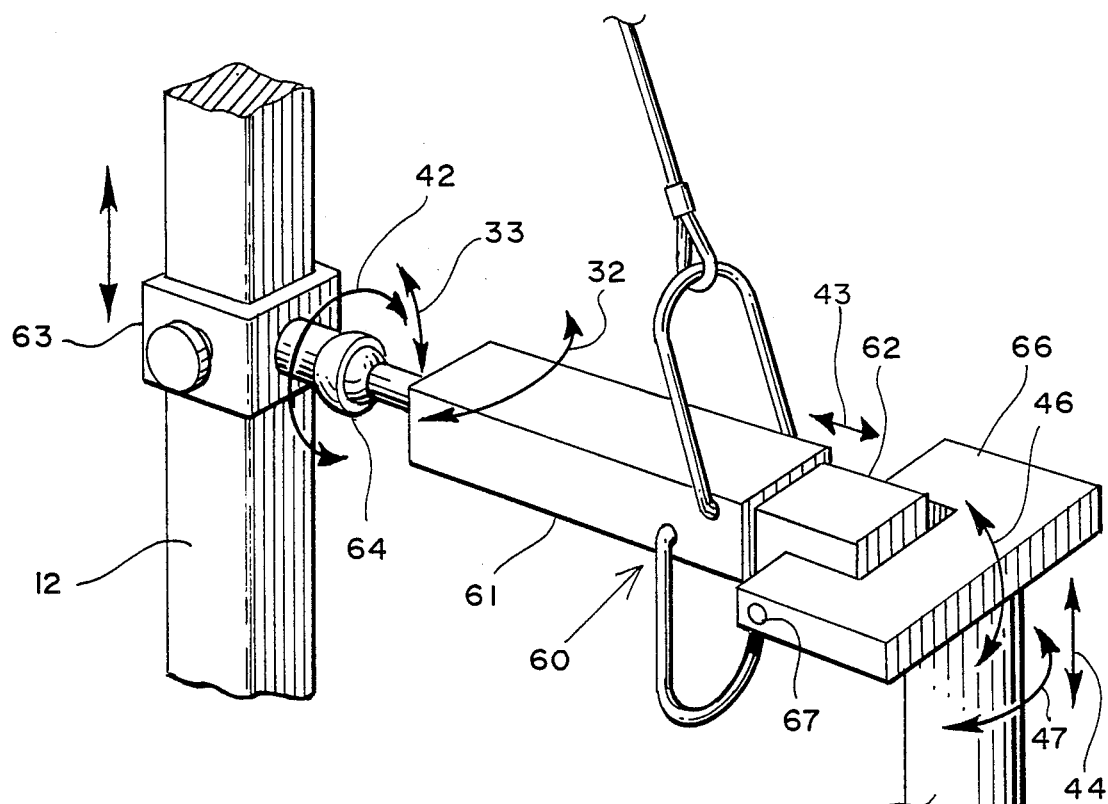
FIG. 2 is an alternate embodiment of the torque reaction arm of FIG. 1, wherein square telescopic tubing is utilized; and, FIG. 3 illustrates an upper horizontal arm member which may be attached to the apparatus of FIG. 1 and thereby provide the combination of the torque reaction arm of the present invention to an upper horizontal bar member of the prior art.

FIG. 2 illustrates the use of square tubing to fabricate torque reaction arm 60. In this embodiment, only two telescoping sections 61 and 62 are utilized which provides for in-and-out motion 43. The connection of torque reaction arm 60 to vertical member 12 through box member 63 and ball-and-socket means 64 provides for horizontal pivoting motion 32, vertical pivoting motion 33 and rotational motion 42. Tool attachment member 66 by means of pin 67 provides for vertically-pivoting motion 46.

In FIG. 3 the horizontal support member 70 is shown and may be utilized with the vertical support member 12 and the torque reaction arms 11 or 60 of FIGS. 1 and 2, respectively. In this embodiment, counterbalancing apparatus 14 is attached to the box member 71 which is slidingly positionable along the length of horizontal support member 72. In FIG. 3 counterbalancing apparatus 14 may comprise a conventional spring-activated counterbalancing reel 50 having a flexible cord 51 attached thereto. The end of cord 51 is attached thereto. The end of cord 51 is attached to a bail 55 which is connected to a tool 17. Counterbalancing apparatus 14 may comprise Nasco Industries, Inc. Part No. TB 1013. Horizontal support member 72 may be attached to vertical member 12 by a pin 73 extending down into an opening in the top of vertical post 12. Thus, the torque reaction arms 11 or 60 may, therefore, be utilized with the tool support apparatus of the prior art.

While the invention has been described, disclosed, illustrated and shown in certain terms or certain embodiments or modifications which is has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

We claim as our invention:

1. Tool support apparatus adapted to support a rotary power tool comprising
   a vertical support post
   base means attached to said vertical post for securing said tool support apparatus to a foundation
   torque reaction means attached to said vertical post for holding said tool and counteracting torque produced by said rotary power tool
   counterbalancing means attached to said vertical post and said torque reaction means for counterbalancing the weight of said tool and said torque reaction means
   means for allowing up-and-down, side-to-side, in-and-out, vertically-pivoting motions and rotation about a longitudinal axis of said torque reacting means of said tool
   said attachment of said counterbalancing means to said torque reaction means being at a location where said torque reaction means relative to said vertical post is limited to up-and-down and vertically pivoting motions wherein the up-and-down motion varies the vertical location of the torque reaction means and varies the force of.the counterbalancing means.

2. The apparatus of claim 1, wherein said torque reaction means comprises at least two telescoping members.

3. The apparatus of claim 2, wherein said at least two telescoping members comprise a first member attached at one end to said vertical post for vertically pivotable motion and slidingly receives a second member at its other end and therewithin, a remote end of said second member being attached to said tool.

4. The apparatus of claim 3, including a tool holding member interposed between the remote end of said second telescoping member and said tool.

5. The apparatus of claim 4, wherein said tool holding member is pivotally attached to said second telescoping member for vertical pivoting motion.

6. The apparatus of claim 3, wherein said at least two telescoping members have a round cross-sectional shape.

7. The apparatus of claim 3, wherein said at least two telescoping members have a square cross-sectional shape.

8. The apparatus of claim 3, wherein said counterbalancing means comprises a coil extension spring attached to the telescoping end of said first telescoping member.

9. The apparatus of claim 3, wherein said counterbalancing means comprises a spring loaded reel having a flexible cord extending therefrom and attached to the telescoping end of said first telescoping member.

10. The apparatus of claim 1, wherein said counterbalancing means is vertically adjustable along the length of said vertical post independent of the vertical adjustment of the torque reaction means.

11. The apparatus of claim 1, wherein said vertical post mounting to said base means provides for horizontally rotatable motion.

12. The apparatus of claim 1, including an upper horizontal arm rotationally attached to said vertical post, said counterbalancing means being attached to said upper horizontal arm for axial motion therealong.

13. Tool support apparatus adapted to support a rotary power tool comprising a vertical support post base means attached to said vertical post for securing said tool support apparatus to a foundation torque reaction means attached to said vertical post for holding said tool and counteracting torque produced by said rotary power tool counterbalancing means attached to said vertical post and said torque reaction means for counterbalancing the weight of said tool and said torque reaction means means for allowing up-and-down, side-to-side, in-and-out, vertically-pivoting motions and rotation about a longitudinal axis of said torque reacting means of said tool said attachment of said counterbalancing means to said torque reaction means being at a location where said torque reaction means relative to said vertical post is limited to up-and-down, horizontal pivoting and vertically pivoting motions and rotation about a longitudinal axis of said torque reacting means wherein the up-and-down motion varies the vertical location of the torque reaction means and varies the force of the counterbalancing means.

* * * * *